No. 672,721. Patented Apr. 23, 1901.
C. W. TAYLOR.
DEVICE FOR EXTRACTING JUICES FROM FRUITS.
(Application filed Jan. 21, 1901.)
(No Model.)
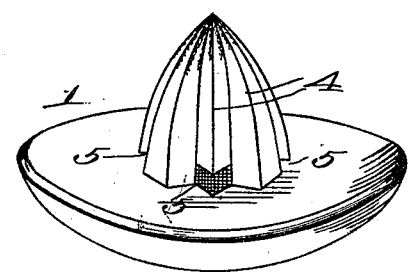
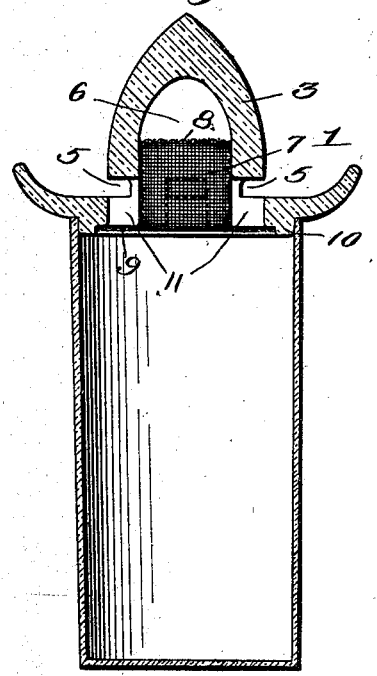
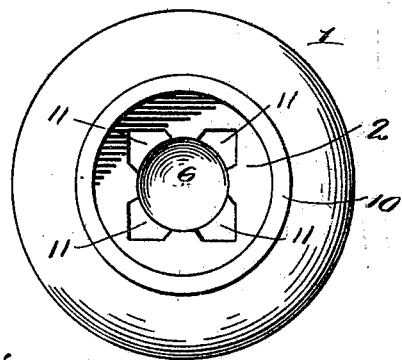
Witnesses:
Inventor
Clarence W. Taylor
By James L. Norris
Atty.

UNITED STATES PATENT OFFICE.

CLARENCE W. TAYLOR, OF SIOUX CITY, IOWA.

DEVICE FOR EXTRACTING JUICES FROM FRUITS.

SPECIFICATION forming part of Letters Patent No. 672,721, dated April 23, 1901.

Application filed January 21, 1901. Serial No. 44,163. (No model.)

*To all whom it may concern:*

Be it known that I, CLARENCE W. TAYLOR, a citizen of the United States, residing at Sioux City, in the county of Woodbury and State of Iowa, have invented new and useful Improvements in Devices for Extracting Juices from Fruits, of which the following is a specification.

This invention relates to an improved device for extracting juices from fruits, and is in the nature of an improvement upon the device for which I obtained Letters Patent No. 645,923, dated March 20, 1900.

The present invention has for its object to provide such a device with a strainer of improved construction which will effectually prevent any seeds, pulp, or solid portion of the fruit from passing through the device with the juice and to provide novel means for securely holding the strainer in place.

It also has for its object to so construct the extractor that the escape of the fruit-juice will be facilitated.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a perspective view of my improved device. Fig. 2 is a vertical central sectional view thereof. Fig. 3 is a bottom view, and Fig. 4 is a detail perspective view, of the strainer.

Referring to the drawings, the numeral 1 indicates the base of the extractor, which is preferably circular and curved upward at its edge, or, in other words, said base is shaped like an ordinary saucer. The base 1 is provided centrally with an opening 2. Projecting vertically from the upper side of the base 1 over the opening 2 is a dome-shaped portion 3, provided on its exterior with a plurality of vertically-disposed ribs 4, V-shaped in cross-section and converging at the center of the top of said dome. Each alternate rib 4 is cut away at its lower end adjacent to the base to form a lateral aperture 5, and the opening 2 in the base extends under said apertures 5. For this purpose the opening 2 in the base is preferably rectangular in shape, as shown in Fig. 3, the corners 11 of said opening being disposed directly beneath the cut-away portions of the ribs 4. By this means the lateral apertures 5 are extended or continued vertically through the base 1 to facilitate the passage therethrough of the fruit-juices. In the arrangement shown a rib 4 will extend downward to the base between each two adjacent apertures 5 and will operate to direct the fruit-juices into said openings. The dome 3 is hollow and is provided with a circular cavity 6, which communicates at its lower end with the opening 2 in the base. In order to permit the fruit-juices to pass freely through the device and at the same time prevent the passage therethrough of pulp, seeds, and other solid portions of the fruit, I provide a strainer having a substantially cylindrical body 7 and a closed upper end 8, and said body 7 at its lower edge is provided with a laterally-projecting annular flange 9. This strainer is preferably struck up from a single piece of wire-gauze or other suitable reticulated or foraminous material and may be suitably coated or treated to resist the action of fruit-acids. The cylindrical body portion of the strainer is inserted in the circular cavity 6 of the dome, and the annular flange 9 is sprung between or within an annular bead or rib 10, formed on the under side of the base 1. The relative circumference of the annular flange 9 and the inside diameter of the annular rib or bead are such that pressure will be required to spring or force the flange to its seat within the rib or bead, and when the flange is so sprung to its seat the strainer will be securely held in place.

All the parts of the device excepting the strainer are preferably made as an integral structure and of any desired and suitable material—such as glass, for example.

The operation of my improved extractor will be readily understood from the foregoing description. A lemon or similar fruit is cut transversely into two equal portions, and one portion at a time is forced down over the dome with a semi-rotary or oscillatory movement, as usual, the ribs exerting a pressing action on the pulp and expressing the juice therefrom. The juice, pulp, and seeds drop down into the saucer-shaped base, and the juice runs down through the lateral apertures 5 and through the corners of the opening 2 in the base. The juice passes freely through the strainer, but the pulp and seeds are arrested thereby. After the juices of the fruit have been extracted the device is inverted, the pulp and seeds falling from the saucer-shaped base. Water is then poured through the strainer, flushing out the latter and the dome and forcing out any substance that may have adhered thereto.

It will be noted that in the present invention the top of the strainer is closed, thus preventing any solid substances that may be forced or work their way up around the strainer from passing down through the center of the latter, and the lateral flange 9 in like manner prevents any such substances that may pass down around the body of the strainer from escaping with the fruit-juice.

In practice the annular bead or rib 10 is made of such diameter as to fit easily within the rim of an ordinary drinking-glass, and thus serve as a means for holding the extractor in place on the glass, into which latter the fruit-juices fall.

Having described my invention, what I claim is—

1. In a device of the class described, the combination with a base having a central aperture and a hollow dome over said aperture having lateral openings, said base being provided on its under side with an annular bead or rib, of a cylindrical strainer arranged in the hollow dome and provided with a lateral annular strainer-flange sprung within said annular bead or rib, portions of said central aperture overlying the lateral flange, substantially as described.

2. In a device of the character described, the combination with a base having a central aperture and a hollow dome over said aperture having lateral openings, said base being provided on its under side with an annular bead or rib, of a cylindrical strainer closed at its upper end and arranged in the hollow dome and provided at its lower end with a lateral annular strainer-flange sprung within said bead or rib, portions of said central aperture overlying the lateral flange, substantially as described.

3. In a device of the character described, the combination with a base having a rectangular aperture centrally therein and a hollow dome over said aperture, said dome being provided externally with vertical ribs, the lower end of each alternate rib being cut away and registering with a corner of the rectangular aperture in the base, and a strainer fitted in the hollow dome and provided at its lower end with a lateral flange disposed beneath the said aperture, substantially as described.

In testimony whereof I have hereunto set my hand in presence of two subscribing witnesses.

CLARENCE W. TAYLOR.

Witnesses:
GEO. M. PARDOE,
R. H. BROWN.